(12) United States Patent
Mangrum et al.

(10) Patent No.: US 7,253,941 B2
(45) Date of Patent: Aug. 7, 2007

(54) HINGE DESIGN FOR ENHANCED OPTICAL PERFORMANCE FOR A MICRO-MIRROR DEVICE

(75) Inventors: Brett A. Mangrum, Dallas, TX (US); Clayton L. Stevenson, Roanoke, TX (US); John P. Ossenfort, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 77 days.

(21) Appl. No.: 10/741,921

(22) Filed: Dec. 19, 2003

(65) Prior Publication Data

US 2005/0134956 A1  Jun. 23, 2005

(51) Int. Cl.
*G02B 26/00* (2006.01)
*G02B 26/08* (2006.01)

(52) U.S. Cl. .................. 359/291; 359/290; 359/223; 359/224; 359/214

(58) Field of Classification Search ............. 359/290, 359/291, 292, 294, 295, 223, 224, 214, 212
See application file for complete search history.

(56) References Cited

U.S. PATENT DOCUMENTS

| 6,257,491 B1* | 7/2001 | Tan et al. ............. 235/462.36 |
| 2003/0117688 A1* | 6/2003 | Meier et al. ............. 359/291 |
| 2004/0165249 A1* | 8/2004 | Aubuchon ............. 359/291 |

* cited by examiner

*Primary Examiner*—Ricky Mack
*Assistant Examiner*—Brandi Thomas
(74) *Attorney, Agent, or Firm*—Charles A. Brill; Wade James Brady, III; Frederick J. Telecky, Jr.

(57) ABSTRACT

An apparatus for use with a digital micro-mirror includes a hinge disposed outwardly from a substrate. The hinge is capable of at least partially supporting a micro-mirror disposed outwardly from the hinge. The micro-mirror is capable of being selectively transitioned between an on-state position and an off-state position. In one particular embodiment, the hinge comprises a substantially flat profile for at least a portion of the hinge disposed between a first hinge post of the hinge and a mid-point of the hinge. The apparatus also includes a plurality of process control voids formed within a conductive layer disposed inwardly from the hinge. In one particular embodiment, the substantially flat profile is at least partially created from the plurality of process control voids.

20 Claims, 3 Drawing Sheets

HINGE DESIGN FOR ENHANCED OPTICAL PERFORMANCE FOR A MICRO-MIRROR DEVICE

TECHNICAL FIELD OF THE INVENTION

This invention relates in general to optical processing devices and, in particular, to an apparatus having an improved hinge design and method of manufacturing the same.

BACKGROUND

Digital micro-mirror devices (DMD) are capable of being used in optical communication and/or projection display systems. DMDs involve an array of micro-mirrors that selectively communicate at least a portion of an optical signal or light beam. DMDs selectively communicate an optical signal or light beam by pivoting between active "on" and "off" states. To permit the micro-mirrors to pivot, each micro-mirror is attached to a hinge that is mounted on one or more support posts.

Conventional DMDs typically formed a sloped and/or sagged hinge profile in an attempt to minimize the effect of "popped" hinges that formed after final annealing of the DMD. Although the sloped and/or sagged profile attempted to minimize the effect of "popped" hinges, in some cases, the sloped and/or sagged profile is still susceptible to developing the "popped" hinges. In addition, the conventional hinges having the sloped and/or sagged profile typically exhibit poor dim line artifact.

SUMMARY

In one embodiment, an apparatus for use with a digital micro-mirror comprises a hinge disposed outwardly from a substrate. The hinge is capable of at least partially supporting a micro-mirror disposed outwardly from the hinge. The micro-mirror is capable of being selectively transitioned between an on-state position and an off-state position. In one particular embodiment, the hinge comprises a substantially flat profile for at least a portion of the hinge disposed between a first hinge post of the hinge and a mid-point of the hinge. The apparatus also comprises a plurality of process control voids formed within a conductive layer disposed inwardly from the hinge. In one particular embodiment, the substantially flat profile is at least partially created from the plurality of process control voids.

In a method embodiment, a method of forming an apparatus for use with a digital micro-mirror comprises forming a plurality of process control voids within a conductive layer disposed outwardly from a substrate. The plurality of process control voids define an intermediate profile of a hinge. The method also comprises forming a hinge layer disposed outwardly from the conductive layer. The hinge layer having the intermediate profile. In one particular embodiment, the intermediate profile comprises an approximately sinusoidal profile having a height of a mid-point that is substantially similar to a height of a first hinge post of the apparatus.

Depending on the specific features implemented, particular embodiments of the present invention may exhibit some, none, or all of the following technical advantages. Various embodiments may be capable of minimizing the likelihood of popped hinges after annealing the device. Some embodiments may be capable of providing an improved dim line performance.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1:
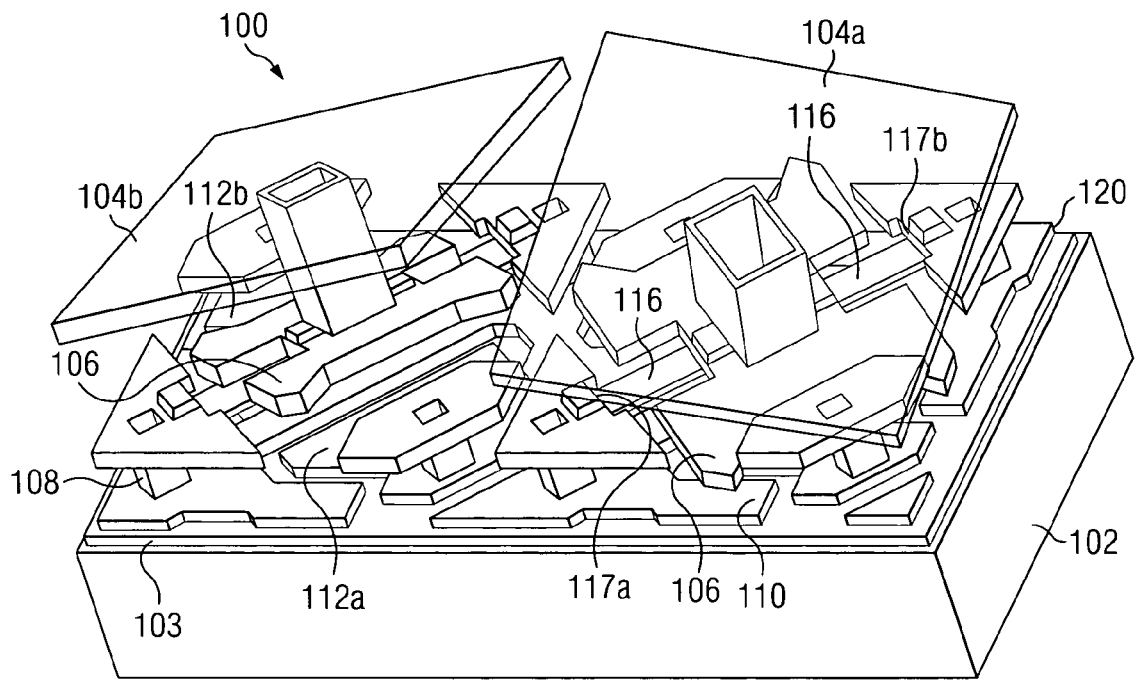
FIG. 1 is a perspective view of one embodiment of a portion of a digital micro-mirror device.

FIG. 1 is a perspective view of one embodiment of a portion of a digital micro-mirror device (DMD) 100. In this example, DMD 100 comprises a micro electro-mechanical switching (MEMS) device that includes an array of hundreds of thousands of tilting micro-mirrors 104. In this example, each micro-mirror 104 is approximately 13.7 square microns in size and has an approximately one micron gap between adjacent micro-mirrors. In some examples, each micro-mirror can be less than thirteen square microns in size. In other examples, each micro-mirror can be approximately seventeen square microns in size. In addition, each micro-mirror 104 may tilt up to plus or minus ten degrees creating an active "on" state condition or an active "off" state condition. In other examples, each micro-mirror 104 may tilt plus or minus twelve degrees for the active "on" state or "off" state.

In this example, each micro-mirror 104 transitions between its active "on" and "off" states to selectively communicate at least a portion of an optical signal or light beam. To permit micro-mirrors 104 to tilt, each micro-mirror 104 is attached to one or more hinges 116 mounted on hinge posts 108, and spaced by means of an air gap over a complementary metal-oxide semiconductor (CMOS) substrate 102. In this example, micro-mirrors 104 tilt in the positive or negative direction until yoke 106 contacts conductive conduits 110. Although this example includes yoke 106, other examples may eliminate yoke 106. In those examples, micro-mirrors 104 tilt in the positive or negative direction until micro-mirrors 104 contact a mirror stop (not explicitly shown).

In this particular example, electrodes 112 and conductive conduits 110 are formed within a conductive layer 120 disposed outwardly from an oxide layer 103. Conductive layer 120 can comprise, for example, an aluminum alloy or other suitable conductive material. Oxide layer 103 operates to insolate CMOS substrate 102 from electrodes 112 and conductive conduits 110.

Conductive layer 120 receives a bias voltage that at least partially contributes to the creation of the electrostatic forces developed between electrodes 112, micro-mirrors 104, and/or yoke 106. In this particular example, the bias voltage comprises a steady-state voltage. That is, the bias voltage applied to conductive layer 120 remains substantially constant while DMD 100 is in operation. In this example, the bias voltage comprises approximately twenty-six volts. Although this example uses a bias voltage of twenty-six volts, other bias voltages may be used without departing from the scope of the present disclosure.

In this particular example, CMOS substrate 102 comprises the control circuitry associated with DMD 100. The control circuitry can comprise any hardware, software, firmware, or combination thereof capable of at least partially contributing to the creation of the electrostatic forces between electrodes 112, micro-mirrors 104, and/or yoke 106. The control circuitry associated with CMOS substrate 102 functions to selectively transition micro-mirrors 104 between "on" state and "off" state based at least in part on data received from a processor (not explicitly shown).

In this particular example, micro-mirror 104a is positioned in the active "on" state condition, while micro-mirror 104b is positioned in the active "off" state condition. The control circuitry transitions micro-mirrors 104 between "on" and "off" states by selectively applying a control voltage to at least one of the electrodes 112 associated with a particular micro-mirror 104. For example, to transition micro-mirror 104b to the active "on" state condition, the control circuitry removes the control voltage from electrode 112b and applies the control voltage to electrode 112a. In this example, the control voltage comprises approximately three volts. Although this example uses a control voltage of approximately three volts, other control voltages may be used without departing from the scope of the present disclosure.

Conventional DMDs typically include a hinge that has a sloped profile between the hinge posts and a mid-point associated with the hinge. That is, at least a portion of the hinge disposed between the hinge post and the mid-point has a height that is substantially different than a height of the hinge post. In most cases, at least a portion of the hinge disposed between the hinge post and the mid-point has a height that is different than a height of the hinge post by at least six-hundred Angstroms.

In addition, conventional DMDs typically form a hinge by depositing a hinge material in a sagged profile between the hinge posts associated with the hinge. That is, a hinge profile that has a mid-point substantially below a plane defined by a height associated with each hinge post. The terms "above" and/or "below" refer to the proximity of a component in relation to another component of the DMD and are not intended to limit the orientation of the device and/or components. In most cases, the sagged profile associated with the hinge of the conventional device is greater than two-hundred fifty Angstroms.

Conventional DMDs typically formed the sloped and/or sagged profile in an attempt to minimize the effect of "popped" hinges that formed after final annealing of the DMD. A "popped" hinge refers to a hinge having at least a portion of a hinge profile that is disposed substantially above a plane defined by a height associated with each hinge post. Although the sloped and/or sagged profile attempted to minimize the effect of "popped" hinges, in some cases, the sloped and/or sagged profile is still susceptible to developing the "popped" hinges. In addition, the conventional hinges having the sloped and/or sagged profile typically exhibit poor dim line performance.

Unlike conventional DMDs, DMD 100 comprises a hinge 116 that has a substantially flat hinge profile between a hinge post 108 and a mid-point (not explicitly shown) of hinge 116. That is, the portion of hinge 116 disposed between hinge post 108 and the mid-point has a height that is substantially similar to a height of hinge post 108. In most cases, the portion of hinge 116 disposed between hinge post 108 and the mid-point has a height that is within two-hundred fifty Angstroms of a height of hinge post 108. In other cases, the portion of hinge 116 disposed between hinge post 108 and the mid-point has a height that is within one-hundred fifty Angstroms of a height of hinge post 108.

To obtain the substantially flat hinge profile, hinge 116 is manufactured by forming an approximately sinusoidal hinge profile between hinge posts 108 (as illustrated in FIGS. 3A-3D). The term "approximately sinusoidal profile" refers to a hinge profile that has a mid-point at approximately the same height as a plane defined by each hinge post and is not intended to limit the shape of the hinge profile to a sinusoid. In some cases, the mid-point can be within twenty Angstroms above or below the plane, and in other cases, the mid-point can be no more than thirty Angstroms below the plane; these are all instances of an approximately sinusoidal hinge. In particular embodiments, the approximately sinusoidal hinge profile comprises approximately two or more periods or repetitions in shape.

One aspect of this disclosure recognizes that by forming hinge 116 having a substantially flat hinge profile device manufactures can improve the yield by reducing the number of "popped" hinges. In addition, providing hinge 116 with a substantially flat hinge profile typically reduces the jitter and/or bouncing that occurs as a result of micro-mirrors 104 transitioning between "on" and "off" states. Reducing the jitter and/or bouncing tends to result in a reduced dim line artifact of DMD 100.

Figure 2:
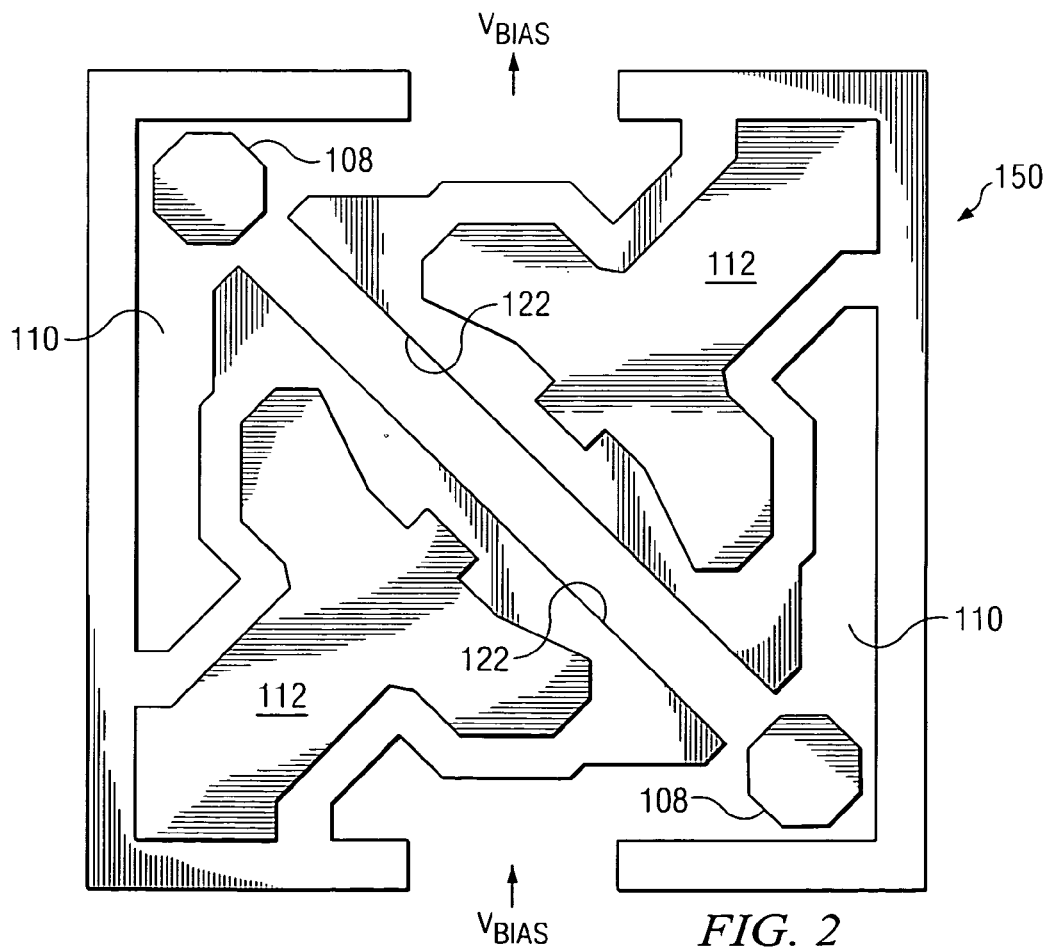
FIG. 2 is a top view of a partially formed digital micro-mirror pixel.

FIG. 2 is a cut-away view of a portion of a micro-mirror assembly 150 associated with a DMD. In FIG. 2, elements that are substantially similar in structure and function to elements in FIG. 1 have the same reference numerals. In this example, assembly 150 includes hinge posts 108, conductive conduits 110, and electrodes 112.

Micro-mirror assembly also includes a plurality of process control voids 122 formed within conductive layer 120. As used in this document, the terms "patterned trench" and "process control voids" are used inter-changeably. Process control voids 122 operate to selectively displace a spacer layer material formed between hinge posts 108. Selectively displacing the spacer layer material formed between hinge posts 108 can advantageously allow device manufacturers to control a profile and/or shape of a spacer layer during its formation. Controlling the profile and/or shape of the spacer layer allows a device manufacturer to control a shape and/or profile of a subsequently formed hinge associated with assembly 150. In some cases, controlling the profile and/or shape of the spacer layer can allow a device manufacturer to form an approximately sinusoidal hinge profile. Forming the pattern of process control voids 122 may be effected through any of a variety of processes, such as, by removing a portion of conductive layer 120.

FIGS. 3A through 3E are cross sectional views illustrating one example of a method of forming a portion of a digital micro-mirror device (DMD) 300. DMD 300 may be used as a basis for forming any of a variety of optical devices, such as a spatial light modulator, a gain equalizer, an optical filter, or combination of these or other optical devices. Particular examples and dimensions specified throughout this document are intended for example purposes only, and are not intended to limit the scope of the present disclosure. Moreover, the illustration in FIGS. 3A through 3E are not intended to be to scale.

Figure 3A:
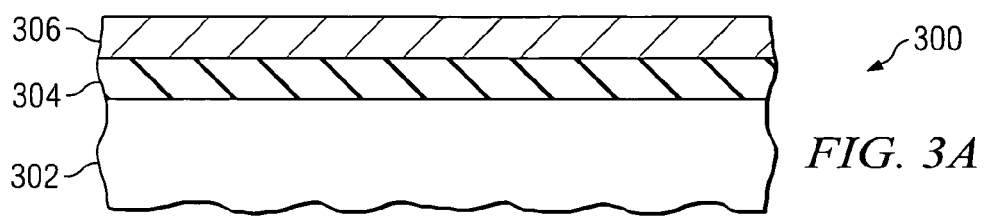
FIGS. 3A through 3E are cross sectional views illustrating one example of a method of forming a portion of a digital micro-mirror device.

FIG. 3A shows a cross sectional view of DMD 300 after formation of a inter-level oxide layer 304 disposed outwardly from a substrate 302 and after formation of a conductive layer 306 outwardly from inter-level oxide layer (ILO) 304. Although substrate 302 and inter-level oxide layer 304 are shown as being formed without interstitial layers between them, such interstitial layers could alternatively be formed without departing from the scope of the present disclosure. Substrate 302 may comprise any suitable material used in semiconductor chip fabrication, such as silicon, poly-silicon, indium phosphide, germanium, or gallium arsenide. In various embodiments, substrate 302 can include complementary metal-oxide semiconductor (CMOS) circuitry capable of controlling DMD 300 after its formation.

Inter-level oxide layer 304 may comprise, for example, oxide, silicon dioxide, or oxi-nitride. Forming inter-level oxide layer 304 may be effected through any of a variety of processes. In one non-limiting example, inter-level oxide layer 304 can be formed by growing an oxide. Using a grown oxide as inter-level oxide layer 304 can advantageously provide a mechanism for removing surface irregularities in substrate 302. For example, as oxide is grown on the surface of substrate 302, a portion of substrate 302 is consumed, including at least some of the surface irregularities.

Conductive layer 306 may comprise, for example, an aluminum alloy or other conductive material. Where conductive layer 306 comprises an aluminum alloy, the aluminum alloy may comprise, for example, aluminum, silicon, polysilicon, tungsten, nitride, and/or a combination of these or other conductive materials. In this example, conductive layer 306 comprises silicon-based aluminum that has light absorbing and/or anti-reflective properties. In other embodiments, conductive layer 306 may include an anti-reflective material disposed outwardly from the silicon-based aluminum layer. Forming conductive layer 306 may be effected, for example, by depositing silicon-based aluminum. Although inter-level oxide layer 304 and conductive layer 306 are shown as being formed without interstitial layers between them, such interstitial layers could alternatively be formed without departing from the scope of the present disclosure.

At some point, the conductive conduits, electrodes, and process control voids (not explicitly shown) associated with DMD 300 are formed within conductive layer 306. Forming the conductive conduits, electrodes, and process control voids may be effected through any of a variety of processes. For example, the conductive conduits, electrodes, and process control voids may be formed by removing a portion of conductive layer 306. In other embodiments, the process control voids can be formed by removing a portion of inter-layer oxide layer 304 prior to the formation of conductive layer 306. In this particular embodiment, the conductive conduits, electrodes, and process control voids are formed by patterning and etching conductive layer 306 using photo resist mask and etch techniques. In some cases, the conductive conduits, electrodes, and process control voids can be formed substantially simultaneously. In other embodiments, the conductive conduits, electrodes, and process control voids can be formed subsequent to one another. In various embodiments, the conductive conduits, electrodes, and process control voids formed in conductive layer 306 can be substantially similar in structure and function as conductive conduits 110, electrodes 112, and process control voids 122 of FIGS. 1 and 2A.

Forming the process control voids in conductive layer 306 can allow a DMD device manufacturer to control the profile and/or shape of a spacer layer during its formation (to be formed later). Controlling the as formed shape of the spacer layer allows a device manufacturer to control as formed shape of a subsequently formed hinge associated with DMD 300.

Figure 3B:
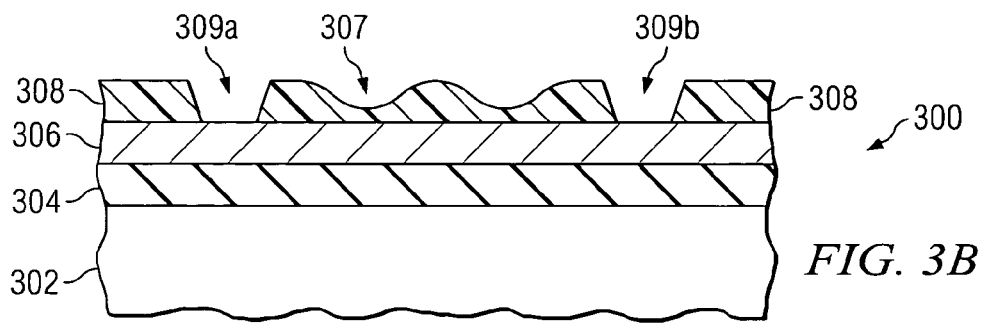

FIG. 3B shows a cross sectional view of DMD 300 after formation of a spacer layer 308 outwardly from inter-level oxide layer 304 and after formation of hinge post cavities 309a and 309b within spacer layer 308. Although spacer layer 308 and conductive layer 306 are shown as being formed without interstitial layers between them, such interstitial layers could alternatively be formed without departing from the scope of the present disclosure. Spacer layer 308 may comprise, for example, a photoresist material or other selectively etchable material. That is, spacer layer 308 can be removed using an etchant that does not significantly affect other materials.

Forming spacer layer 308 may be effected through any of a variety of processes. For example, spacer layer 308 can be formed by depositing or spinning-on a photo-resist material. In the illustrated embodiment, spacer layer 308 comprises a material that is selectively etchable from conductive layer 306 and/or inter-level oxide layer 304. That is, each of spacer layer 308 and conductive layer 306 and/or inter-level oxide layer 304 can be removed using an etchant that does not significantly affect the other.

In this particular example, spacer layer 308 is formed after formation of the process control voids within conductive layer 306. Forming the process control voids before forming spacer layer 308 allows device manufacturers to control a profile 307 of spacer layer 308. Profile 307 depends at least in part on the location and pattern of the process control voids. Controlling profile 307 can advantageously allow DMD device manufacturers to form a desired hinge profile. In some cases, profile 307 can allow device manufacturers to form an approximately sinusoidal hinge profile.

Forming hinge post cavities 309a and 309b may be effected through any of a variety of processes. For example, hinge post cavities 309a and 309b can be formed by patterning and etching spacer layer 308.

Figure 3C:
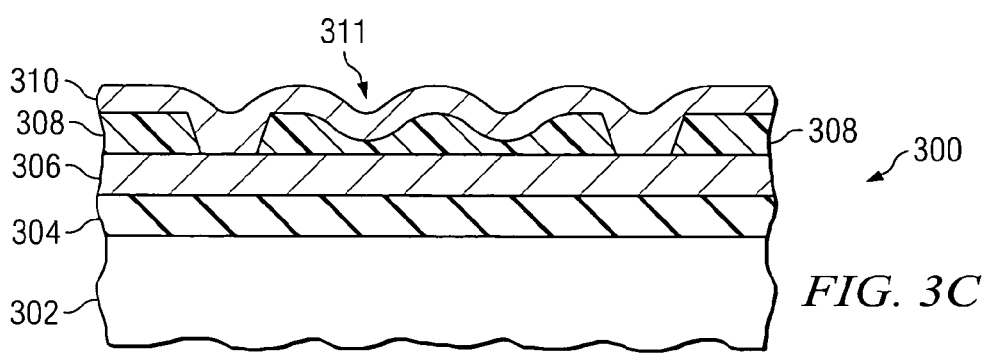

FIG. 3C shows a cross sectional view of DMD 300 after formation of a hinge layer 310 outward from spacer layer 308. Although spacer layer 308 and hinge layer 310 are shown as being formed without interstitial layers between them, such interstitial could alternatively be formed without departing from the scope of the present disclosure. Forming hinge layer 310 may be effected through any of a variety of processes. For example, hinge layer 310 can be formed by depositing an aluminum alloy. Hinge layer 310 may comprise, for example, aluminum, silicon, polysilicon, tungsten, nitride, and/or a combination of these or other materials. In this example, hinge layer 310 comprises an aluminum alloy that has reflective properties. In other examples, hinge layer 310 could comprise an aluminum compound that has light absorbing and/or anti-reflective properties. Forming hinge layer 310 may be effected, for example, by depositing an aluminum alloy.

In some cases, controlling the pattern associated with the process control voids, the deposition rate, and/or other process parameters can allow a DMD device manufacturer to control hinge profile 311. In this example, the formation of hinge layer 310 results in at least a portion of hinge layer 310 having a hinge profile 311. Although hinge profile 311 approximates a sinusoid in this example, any desired shape may be formed without departing from the scope of the present disclosure.

Figure 3D:
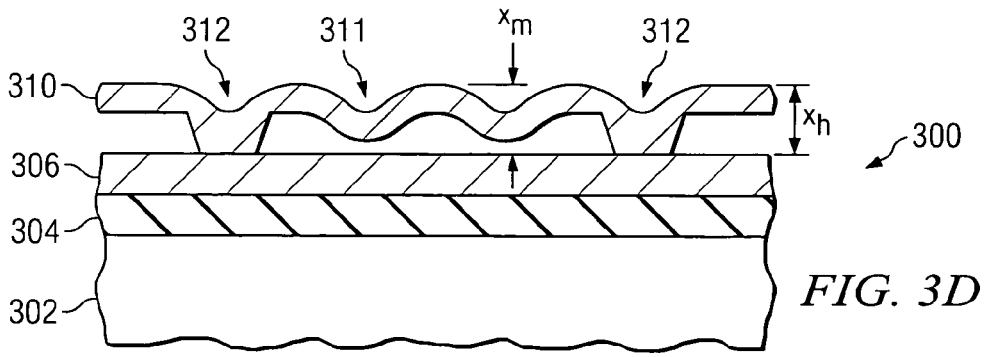

FIG. 3D shows a cross sectional view of DMD 300 after removal of spacer layer 308. Spacer layer 308 can be removed by any of a number of processes, such as, for example, by performing an isotropic plasma etch. Although this example illustrates the removal of spacer layer 308 after depositing hinge layer 310 without any additional process steps, such additional process steps could alternatively be performed without departing from the scope of the present disclosure.

In this particular embodiment, hinge profile 311 comprises an approximately sinusoidal hinge profile having approximately two periods or repetitions in shape. That is, hinge profile 311 has a mid-point height ($X_M$) at approximately the same height as a hinge post height ($X_H$) associated with hinge posts 312. In some cases, the mid-point height ($X_M$) can be within twenty Angstroms above or below the hinge post height ($X_H$). In other cases, the mid-point height ($X_M$) can be no more than thirty Angstroms below the hinge post height ($X_H$).

Figure 3E:
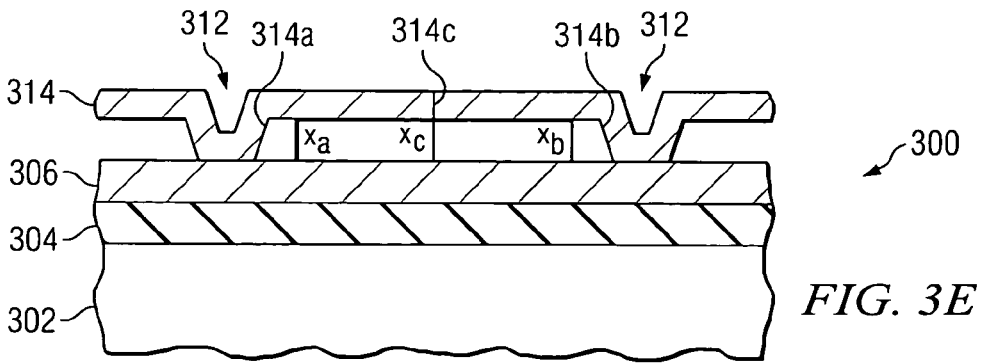

FIG. 3E shows a cross sectional view of DMD 300 after forming a substantially flat hinge 314. Although this example illustrates forming substantially flat hinge 314 after removal of spacer layer 308 without any additional process steps, such additional process steps could alternatively be performed without departing from the scope of the present disclosure.

Substantially flat hinge 314 can be formed by any of a number of processes, such as, for example, by subjecting hinge layer 310 to an anneal process. In various embodiments, the anneal process can be performed at a specified temperature for a desired period. The anneal temperature being based at least in part on an anneal time necessary to activate the device. In various embodiments, the anneal process can comprise subjecting hinge layer 310 to a temperature of between one-hundred degrees Celsius and two-hundred degree Celsius for nine to fifteen hours.

One aspect of this disclosure recognizes that forming an approximately sinusoidal hinge profile 311 can allow DMD device manufacturers to form a hinge having a substantially flat profile. In this particular embodiment, hinge 314 comprises a substantially flat profile after the anneal process. That is, the portion of hinge 314 disposed between hinge post 312 and a mid-point 314c has a height that is substantially similar to a height associated with hinge post 312. In this particular embodiment, the portion of hinge 314 disposed between first end 314a and mid-point 314c has a height ($X_c$) that is within two-hundred fifty Angstroms of a height ($X_a$) associated first end 314a. In some embodiments, the portion of hinge 314 disposed between second end 314b and mid-point 314c has a height ($X_c$) that is within two-hundred fifty Angstroms of a height ($X_c$) associated with second end 314b. In other embodiments, the portion of hinge 314 disposed between first end 314a and mid-point 314c has a height ($X_c$) that is within one-hundred fifty Angstroms of a height ($X_a$) associated first end 314a.

One aspect of this disclosure recognizes that by forming hinge 314 having a substantially flat hinge profile device manufactures can improve the yield by reducing the number of "popped" micro-mirrors. In addition, providing hinge 314 with a substantially flat hinge profile typically reduces the jitter and/or bouncing that occurs as a result of the micro-mirrors transitioning between "on" and "off" states. Reducing the jitter and/or bouncing tends to result in an improved dim line performance of DMD 300.

Figure 4A:
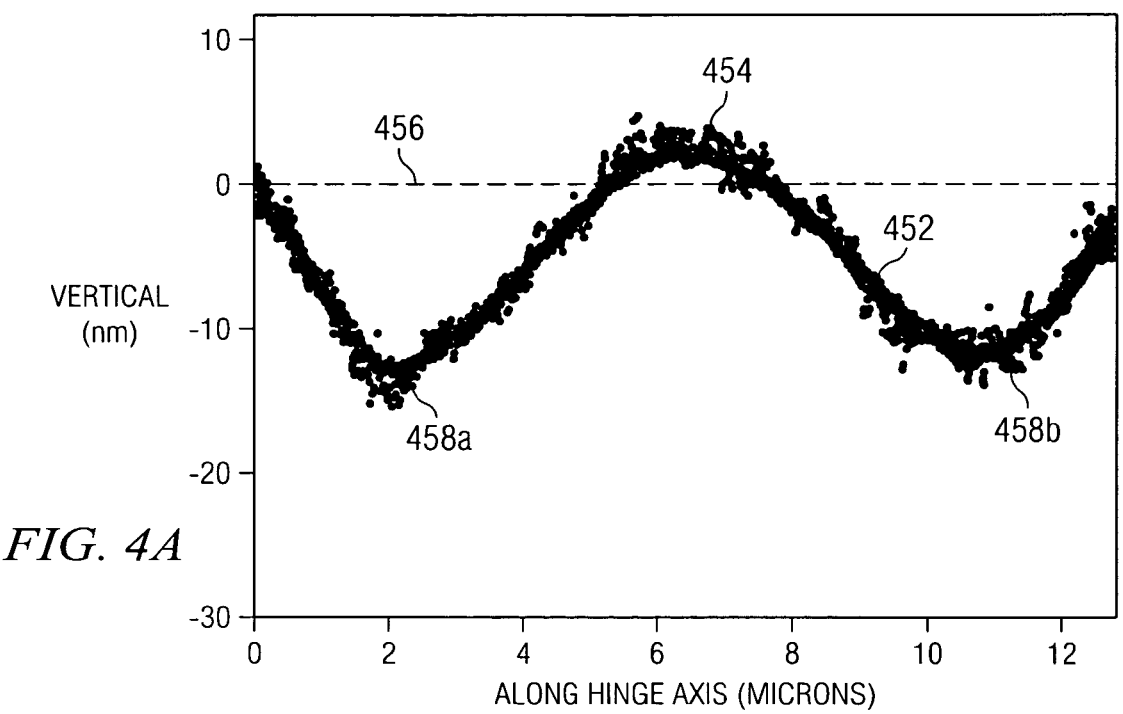
FIGS. 4A through 4C are a cross sectional view of a hinge profile before subjecting the hinge to an anneal process.

FIG. 4A is a cross sectional view of a hinge profile 452 before subjecting a hinge to an anneal process. In this example, hinge profile 452 comprises an approximately sinusoidal hinge profile between hinge posts 108 of FIG. 2. That is, hinge profile 452 has a mid-point height 454 at approximately the same height as a plane 456 defined by a height associated with each hinge post 108. In this particular embodiment, mid-point height 454 is approximately two nanometers (e.g., twenty Angstroms) above plane 456. In other cases, mid-point height 454 can be no more than three nanometers (e.g., thirty Angstroms) below plane 456.

In this particular example, hinge profile 452 approximates a sinusoid having approximately two periods or repetitions in shape. Hinge profile 452 includes valleys 458a and 458b defining a depth associated with hinge profile 452. Valleys 458 can comprise, for example, a depth of no more than fourteen nanometers.

Figure 4B:
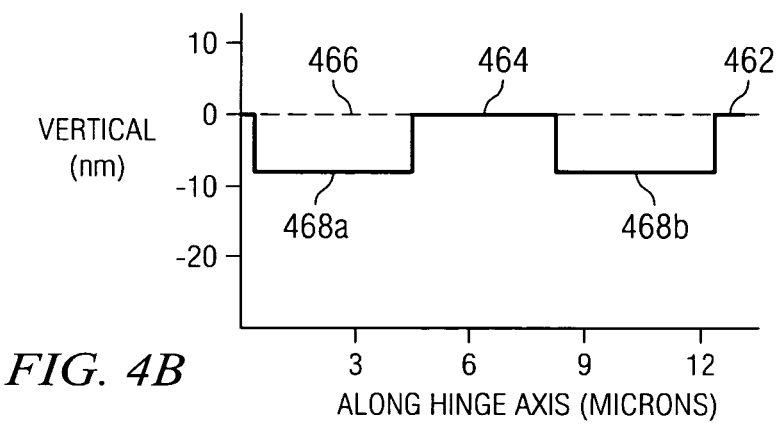

FIG. 4B is a cross sectional view of a hinge profile 462 before subjecting a hinge to an anneal process. In this example, hinge profile 462 comprises an approximately sinusoidal hinge profile between hinge posts 108 of FIG. 2. That is, hinge profile 462 has a mid-point height 464 at approximately the same height as a plane 466 defined by a height associated with each hinge post 108. In this particular embodiment, mid-point height 464 is approximately one nanometer (e.g., ten Angstroms) above plane 466. In other cases, mid-point height 464 can be no more than three nanometers (e.g., thirty Angstroms) below plane 466.

In this particular example, hinge profile 462 comprises approximately two periods or repetitions in shape. Hinge profile 462 includes valleys 468a and 468b defining a depth associated with hinge profile 462. Valleys 468 can comprise, for example, a depth of no more than ten nanometers.

Figure 4C:
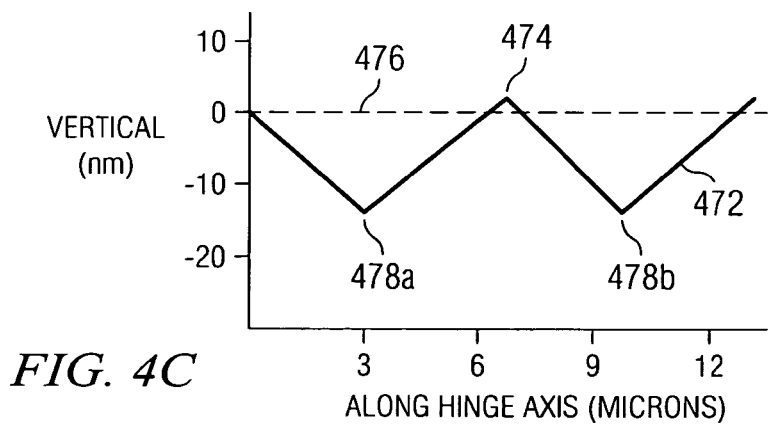

FIG. 4C is a cross sectional view of a hinge profile 472 before subjecting a hinge to an anneal process. In this example, hinge profile 472 comprises an approximately sinusoidal hinge profile between hinge posts 108 of FIG. 2. That is, hinge profile 472 has a mid-point height 474 at approximately the same height as a plane 476 defined by a height associated with each hinge post 108. In this particular embodiment, mid-point height 474 is approximately 1.5 nanometers (e.g., fifteen Angstroms) above plane 476. In other cases, mid-point height 474 can be no more than three nanometers (e.g., thirty Angstroms) below plane 476.

In this particular example, hinge profile 472 comprises approximately two periods or repetitions in shape. Hinge profile 472 includes valleys 478a and 478b defining a depth associated with hinge profile 472. Valleys 478 can comprise, for example, a depth of no more than sixteen nanometers.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method of forming a micromechanical device comprising:
   forming a hinge structure having an approximately sinusoidal profile; and
   forming a deflectable member supported by said hinge structure.

2. The method of claim 1, said forming a hinge structure comprising forming a hinge structure having an approximately sinusoidal profile of approximately two periods.

3. The method of claim 1, comprising:
   forming a plurality of process control voids to influence said profile of said hinge structure.

4. The method of claim 1, said forming a hinge structure comprising forming a hinge structure having a mid-point and two end-points spaced apart from a substrate at a height relative to a plane of a substrate within 150 Angstroms of each other.

5. The method of claim 1, said forming a hinge structure comprising forming a hinge structure of an aluminum alloy.

6. The method of claim 1, comprising:
annealing said hinge structure.

7. The method of claim 1, said forming a deflectable member comprising forming a deflectable mirror.

8. An apparatus comprising:
a hinge structure having an approximately sinusoidal profile; and
a deflectable member supported by said hinge structure.

9. The apparatus of claim 8, said hinge structure having an approximately sinusoidal profile of approximately two periods.

10. The apparatus of claim 8, said hinge structure having a mid-point and two end-points spaced apart from a substrate at heights relative to a plane of a substrate within 150 Angstroms of each other.

11. The apparatus of claim 8, said hinge structure formed of an aluminum alloy.

12. The apparatus of claim 8, said hinge structure comprising an annealed metal.

13. The apparatus of claim 8, said deflectable member comprising a deflectable mirror.

14. A method of forming a micromechanical device comprising:
providing a substrate;
forming a hinge support structure on said substrate;
depositing a spacer layer supported by said substrate;
forming a hinge structure supported by said hinge support structure and having an approximately sinusoidal profile;
forming a deflectable member supported by said hinge structure; and
removing said spacer layer.

15. The method of claim 14, said forming a hinge structure comprising forming a hinge structure having an approximately sinusoidal profile of approximately two periods.

16. The method of claim 14, comprising:
forming a plurality of process control voids to influence said profile of said hinge structure.

17. The method of claim 14, said forming a hinge structure comprising forming a hinge structure having a mid-point and two end-points spaced apart from said substrate at heights relative to said substrate within 150 Angstroms of each other.

18. The method of claim 14, said forming a hinge structure comprising forming a hinge structure of an aluminum alloy.

19. The method of claim 14, comprising:
annealing said hinge structure.

20. The method of claim 14, said forming a deflectable member comprising forming a deflectable mirror.

* * * * *